United States Patent [19]

Kricker et al.

[11] Patent Number: 5,332,374
[45] Date of Patent: Jul. 26, 1994

[54] AXIALLY COUPLED FLAT MAGNETIC PUMP

[76] Inventors: Ralph Kricker, 362 Mulberry Point Rd., Guilford, Conn. 06437; Sheldon Childs, 360 Tolland Turnpike, Willington, Conn. 06279

[21] Appl. No.: 999,523

[22] Filed: Dec. 30, 1992

[51] Int. Cl.⁵ .............................................. F04B 17/00
[52] U.S. Cl. .................................... 417/420; 417/423.7
[58] Field of Search ............... 417/420, 423.6, 423.7, 417/423.15, 423.11, 423.12, 423.14; 310/103, 104, 254, 258

[56] References Cited

U.S. PATENT DOCUMENTS

| | | |
|---|---|---|
| 3,107,310 | 10/1963 | Carriere et al. |
| 3,572,982 | 3/1971 | Kozdon ............................ 417/423 |
| 3,826,938 | 7/1974 | Filer ................................. 310/104 |
| 4,043,706 | 8/1977 | Walker ............................. 417/353 |
| 4,164,690 | 8/1979 | Müller et al. ................. 417/423.7 |
| 4,167,661 | 9/1979 | Ohkubo ........................... 310/103 |
| 4,260,920 | 3/1981 | Nakamura et al. ............. 310/156 |
| 4,880,362 | 11/1989 | Laing et al. .................... 417/365 |
| 5,044,897 | 9/1991 | Dorman ....................... 417/423.7 |
| 5,176,509 | 1/1993 | Schmider et al. ............ 417/423.7 |

FOREIGN PATENT DOCUMENTS

| | | | |
|---|---|---|---|
| 0284995 | 12/1987 | Japan ............................... 417/420 |
| 0302198 | 12/1988 | Japan ............................... 417/420 |

Primary Examiner—Henry A. Bennett
Assistant Examiner—Alfred Basichas
Attorney, Agent, or Firm—Low and Low

[57] ABSTRACT

An axially coupled magnetic pump having a housing of minimum motor length, including an eddy-free seal sheet interposed between the rotor and stator, and sealing the pump housing outwardly of the rotor. A rotor magnet configuration in conjunction with specific sensor positioning to effect close driving control over the pump.

11 Claims, 3 Drawing Sheets

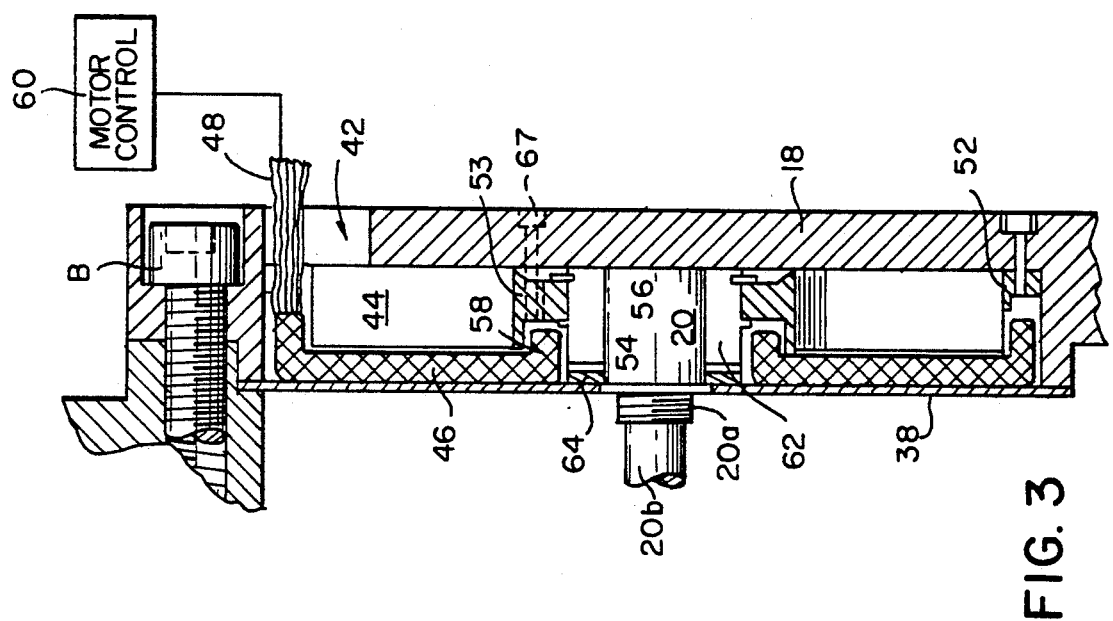
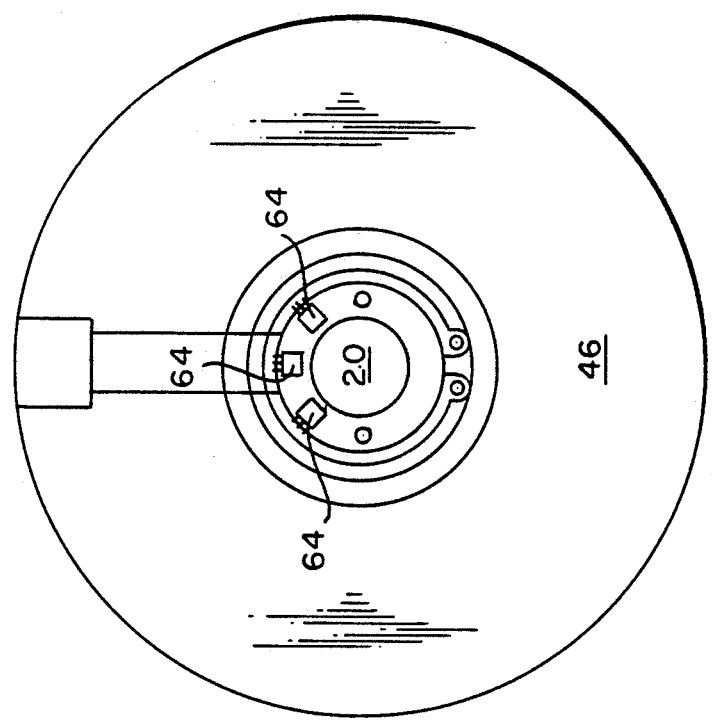

AXIALLY COUPLED FLAT MAGNETIC PUMP

BACKGROUND OF THE INVENTION

Magnetic pumps have long been known in the art wherein conventional longitudinally and coaxially arranged central rotor and surrounding annular stator magnetic components and circuits are employed whereby the driven rotor shaft rotates and operates a pump element as a scroll, centrifugal volute, or other vane arrangement in the handling of fluids, especially liquid.

While obviously useful pump systems, the concentric and longitudinal stator/rotor array inherently requires an elongated housing for the same, with difficulties in manufacture, sealing of the pumped fluid from the stator, access to the pump rotor and stator elements, and the physical placement of elongated pump housing structures in the limited space of a particular service environment.

There has been limited development of axially coupled magnetic pumps wherein axially confronting disc-like radial arrays of rotor and stator magnetic elements provide a relatively axially short housing requirement, thereby facilitating placement and usage of the pump. Illustrative of such arrangements are U.S. Pat. No. 2,481,172 to Staggs and Switzerland Patent 65,594 to Graemiger, for example.

Such known arrangements, however, do not provide ready mounting of the rotor, facile sealing, motor operation and control, or access and maintenance arrangements as are to be preferred.

BRIEF SUMMARY OF THE INVENTION

The present invention includes as salient features a magnetically coupled pump of minimum axial extent wherein fabrication, assembly, access, and reliability are enhanced.

Improved yet simplified means are provided to preclude liquid leakage from the pumping element toward the stator windings, while ensuring good magnetic coupling between the stator and rotor elements.

Further, means are provided for simply and effectively mounting the rotor on a stub shaft to facilitate assembly and reduce cost.

In addition, magnetic sensors are provided such that detection therefrom can readily control motor speed or other load parameters whether under manual or program control of motor operation. Further, despite proximity to the stator windings, the sensors are not triggered thereby, but only by the rotor magnets.

Other objects and advantages of the invention will become apparent from the following more detailed description setting forth a best mode of the invention.

BRIEF DESCRIPTION OF THE DRAWINGS

FIG. 3 is a generally side section view of the stator mounting arrangement;

FIG. 5 is a general showing of the stator adjacent the seal plate showing the arrangement of the Hall effect sensors.

DETAILED DESCRIPTION OF THE DISCLOSED EMBODIMENT

Figure 1:
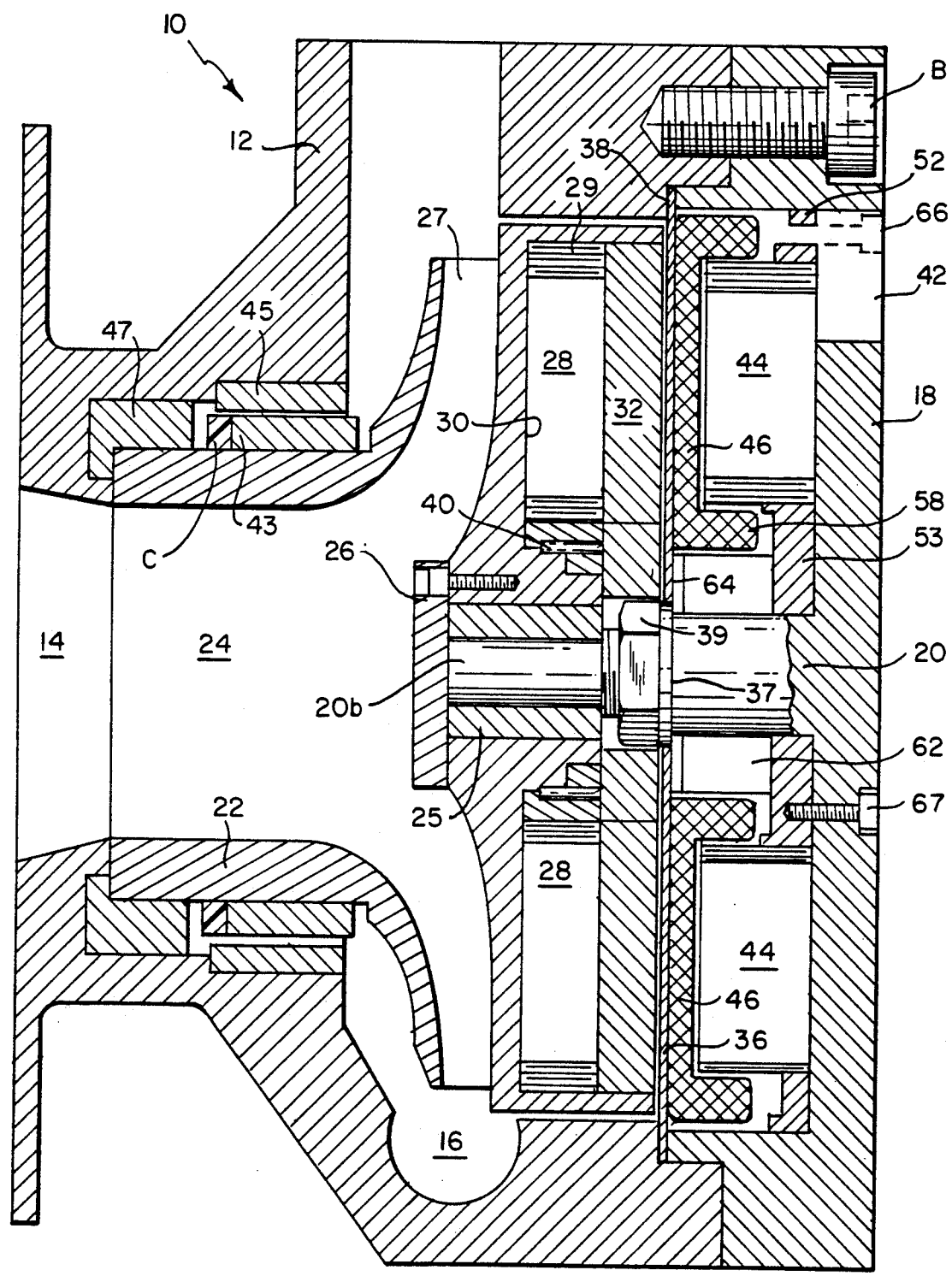
FIG. 1 is a general side sectional elevation of the improved pump of the invention.

Referring to the drawings, especially FIG. 1, the overall pump assembly is shown generally at 10, and includes housing 12, having an axial inlet flow passage 14 and an annular outlet passage at 16 of conventional nature. The housing opposite the fluid inlet is provided with a heavy closure member 18, discussed further hereinafter, detachably interfitted with and secured to the housing as by a plurality of circumferentially arranged axially extending peripheral bolts B (FIG. 3).

The cover plate 18 has extending axially therefrom a fixed stub shaft 20 including a reduced diameter threaded intermediate portion 20a for receiving a nut 39, and inwardly thereof a further reduced cylindrical terminal portion 20b. Terminal portion 20b receives thereon a pump impeller 22, shown as a shrouded impeller of conventional form including inlet bore 24 and generally radial outlet passages 27 to the housing outlet passage 16. A sleeve bearing 25 is interposed between the stub shaft 20 and impeller 22 in conventional manner, and a cap plate 26 secured to the impeller overlies the end of the stub shaft.

The inlet end of the impeller rotor at 24 has secured thereto as by threading an annular magnetic bearing 43 which cooperates with a like static bearing 45 fixedly carried by the housing 12 in conventional manner to serve as a thrust bearing for the axial forces on the impeller. In preferred form, the bearings comprise cemented alternating laminations of steel and permanent magnets extending axially from a threaded securing collar C. The magnetic bearing assembly 43, 45 seeks thereby to retain the axial position of the impeller against the axial forces either of the magnetic attraction of the stator or the thrust in the opposite direction due to the pressure differential of the fluid between the inlet and outlet flow. The pump housing also carries a radial sleeve bearing 47 within which the entrance end of impeller 22 is received. Sleeve bearings may be formed from ceramic, carbon fibre, graphite, or other material appropriate to the fluid being pumped.

The impeller 22 forms the rotor of the pump motor and within an axially extending peripheral annular flange or retaining wall 29 carries an annular series of tape wound and permanent magnets at its rear face. The annular wall 29 may be formed integral with the impeller, or may be a separately formed annulus later secured to the impeller to be integral therewith.

Figure 2:
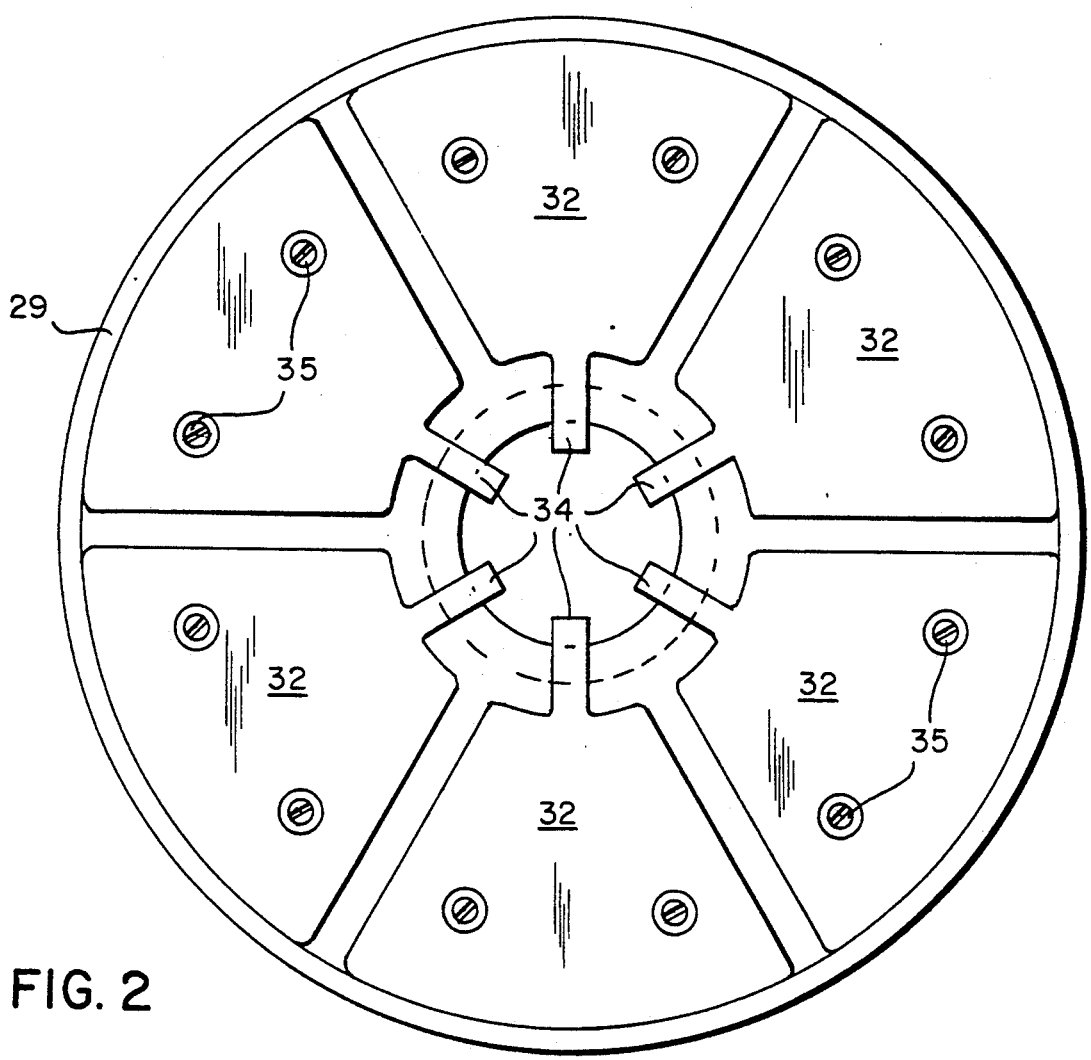
FIG. 2 is a general plan view of the rotor magnet arrangement.

With specific reference to the rotor, a tape-wound magnetic core 28 is arranged axially adjacent the rear face 30 of impeller 22, and may be secured thereto as by cement as well as being pinned thereto as at 40. The tape is preferably a silicon steel tape. Similarly, a circumferential series of permanent magnets 32 are arranged overlying magnetic core 28 and secured thereto and thereby to the impeller as by cement or by screws 35 (FIG. 2). It should be noted that a radially innermost portion 34 of each permanent magnet 32 has a special function to activate Hall effect sensors in the stator, as set forth hereinafter. The magnets 32 as best seen in FIG. 2 of the drawings are generally fan- or wedge-shaped with the innermost portion 34 thereof as a narrow tip extension therefrom.

In the disclosed embodiment, six such magnets of substantially 60° arc are employed to complete the circular array. The entirety of the tape wound core and permanent magnets is sealed within the impeller rear face recess in potted manner, as by an epoxy molding compound.

Importantly, the rotor 22 is sealed within the pump housing axially outwardly thereof by a thin planar seal plate 36 surrounding stub shaft 20 in sealed relation thereto and extending fully across the open end of the housing to seat peripherally on housing annular recess surface 38. The seal plate is preferably of a non-magnetic and electrically inert material as a resin and glass fiber laminate or the like. So formed, the same avoids eddy currents therein during motor and impeller operation, thereby preventing unwanted heating thereof or of any relative heat sensitive fluid being pumped. The relatively rigid seal plate 36 is clamped on its outer periphery between the face of cover 18 and the internal rabbet 38 in the pump housing. The inner periphery of seal plate 36 is clamped by the threaded nut 39 against a shoulder 37 provided on stub shaft 20, thereby preventing any deflection in the direction of the impeller. The seal plate is also supported over its entire surface by cover plate 18, thereby preventing any fluid leakage.

On the other side of plate 36 are disposed the stator coils, magnetic return (yoke) 44 and the sensor pickup. Thus, as seen in the drawings, there is a circumferentially arranged array of stator coils 46 mounted in close proximity to and bonded to the magnetically permeable steel core 44. The steel core is preferably a tape wound structure to diminish eddy currents. The leads to the motor windings are grouped in usual manner and extend externally at 48 through an aperture 42 in cover 18, and thence to suitable external control means 60 for the motor, as best seen in FIG. 3. The stator elements are secured against rotational and axial forces, as by mounting the same in an annular support bracket 52 carrying the stator assembly, and bolting that to cover 18 by means of screws 66.

The stator magnetic core with coils attached is additionally mounted on an annulus 53 and bonded thereto. In turn, the same is fastened to cover 18 by screws 67 thereby further to preclude any movement whatever of the stator under magnetic or mechanical excitation forces. A further annulus 62 axially inwardly of annular bracket 53 and relatively rotatable with respect thereto supports one or more magnetic sensors 64. Annulus 62 is mounted upon stub shaft 20 which is attached to or integral with the cover plate 18.

Figure 4:
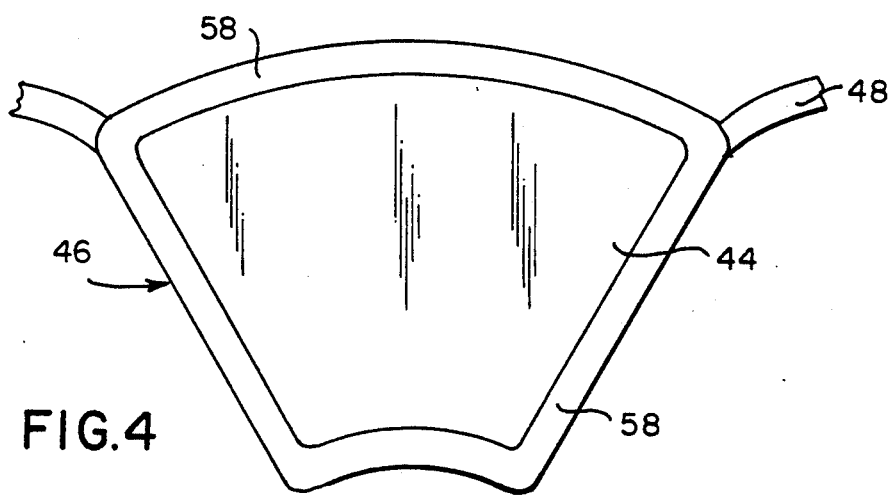
FIG. 4 is a plan view illustrating one stator wound magnet.

More particularly, and as seen in FIGS. 3 and 4, the windings 46 are cup-shaped to enclose cores 44 and thereby include upturned and axially extending peripheral portions 58. So formed, the radially extending major portion of 46 exerts magnetic forces in connection with rotor drive, while the turned peripheral portion 58 is inactive in this regard, providing essentially a buffer between the active windings and the Hall effect sensors 64.

The Hall effect sensors 64 are disposed about the stub shaft as indicated, and are in axially aligned relation to the arc of rotor magnet tips 34 to thereby detect rotor activity and effect motor control through the external leads therefrom in known manner as desired through the winding control means 60. Thus, the sensors 64 effectively trigger the application of voltage to the stator windings in phase relation to the physical position of the rotor magnets, and specifically the radially inward tips 34 thereof.

Accordingly, the control means 60 responds to the sensors to vary and control motor speed, which may include suitable programming responsive to pump flow or output, or to relate the same to any other process variable in the pump system.

The stator elements are received and pocketed within the cup-like cavity of the closure 18, and the cavity is preferably filled with a heat conductive and electrically non-conductive elastomer such as metallic oxide-filled silicone or the like. As with the rotor, it is important to note that the spatial dimensioning is such that the stator coil assembly is immediately proximate seal sheet 36 when cover 18 carrying the stator is secured to the pump housing thereby precluding any destructive deflection of the seal sheet 38 which is subjected to internal pump fluid pressures.

The winding pattern of the stator is substantially conventional, and typically may embrace use of a 54-coil stator with six poles in a usual three-phase array.

It will be seen that with the construction described, that a versatile and powerful substantially flat motor is provided to drive a centrifugal pump in uniquely mounting the pump impeller and motor rotor on the aforesaid stub shaft, with the rotor magnets pocketed on the rear face of the impeller and adjacent to the seal plate having the stator immediately adjacent the other side thereof with the control sensors radially inwardly therefrom.

What we claim is:

1. An axially coupled flat magnetic pump comprising,
   a pump housing having a fixed stub shaft projecting thereinto centrally thereof,
   a pump rotor mounted in said housing on said stub shaft and including an impeller having axial and centrifugal flow channels on one side of said rotor,
   said rotor including a circumferential series of magnets on the other side thereof,
   a seal plate extending between the periphery of said housing and said stub shaft adjacent said rotor to preclude leakage of fluid outwardly of said housing axially past said rotor,
   a stator having a series of energizable stator coil magnet windings in circumferential array adjacent said seal plate to effect rotation of said rotor and impeller upon energization thereof,
   a cup-like cover plate receiving and peripherally enclosing said stator magnet windings,
   means detachably securing said cover plate to said housing,
   a magnetic sensor disposed in axial proximity to said rotor magnets, and,
   means for positioning said sensor adjacent said stator, said means including an annulus disposed about said stub shaft carrying said sensor on the axially inward face thereof.

2. The axially coupled magnetic pump of claim 1 wherein said seal plate is of electrically non-conductive material thereby to preclude eddy current losses.

3. The axially coupled magnetic pump of claim 2 wherein said stator magnet windings are mounted immediately adjacent said seal plate to maximize proximate relation to said rotor and to rigidify said seal plate against fluid distortion from pump fluid flow.

4. The axially coupled magnetic pump of claim 1 wherein said positioning means permits rotation of said sensor with respect to said stator thereby to optimize the electromagnetic phase relationship between the rotor magnetic field axis and the axis of the stator field from its current source.

5. The axially coupled magnetic pump of claim 1 wherein said magnetic sensor is positioned relative to said stator coil windings such that the magnetic field of the coil windings carrying current is everywhere in space quadrature with or focussed away from the sensing axis of said sensor, thereby precluding excitation of said sensor by magnetic fields of said stator.

6. The axially coupled magnetic pump of claim 1 further including control means for said sensor, said control means being selectively responsive to external parameters including computer programs or fluid flow variables, thereby to regulate the rotation of said pump in accordance with said external parameters.

7. The axially coupled magnetic pump of claim 1 wherein said impeller includes a magnetic bearing at an inlet end thereof.

8. The axially coupled magnetic pump of claim 1 wherein there are a plurality of said sensors.

9. An axially coupled flat magnetic pump comprising, a pump housing having a fixed stub shaft projecting thereinto centrally thereof, a pump rotor mounted in said housing on said stub shaft and including an impeller having axial and centrifugal flow channels on one side of said rotor, said rotor including a circumferential series of magnets on the other side thereof, a seal plate extending between the periphery of said housing and said stub shaft adjacent said rotor to preclude leakage of fluid outwardly of said housing axially past said rotor, a stator having a series of energizable stator coil magnet windings in circumferential array adjacent said seal plate to effect rotation of said rotor and impeller upon energization thereof, a cup-like cover plate receiving and peripherally enclosing said stator magnet windings, means detachably securing said cover plate to said housing, a magnetic sensor disposed in axial proximity to said rotor magnets, wherein said rotor magnets are of fan-shaped configuration and include radially inwardly extending tips for actuation of said sensor.

10. The axially coupled magnetic pump of claim 9 wherein said rotor magnet tips are positioned on said rotor so as to lie at substantially the same radial distance from the axis of said pump as said magnetic sensor.

11. The axially coupled magnetic pump of claim 10 wherein there are a plurality of said sensors.

* * * * *